United States Patent
Courier

(10) Patent No.: US 9,056,327 B2
(45) Date of Patent: Jun. 16, 2015

(54) MODULAR PLURAL COMPONENT SPRAY SYSTEM

(71) Applicant: John P. Courier, Renton, WA (US)

(72) Inventor: John P. Courier, Renton, WA (US)

(*) Notice: Subject to any disclaimer, the term of this patent is extended or adjusted under 35 U.S.C. 154(b) by 0 days.

(21) Appl. No.: 14/103,919

(22) Filed: Dec. 12, 2013

(65) Prior Publication Data

US 2014/0166775 A1 Jun. 19, 2014

Related U.S. Application Data

(60) Provisional application No. 61/737,591, filed on Dec. 14, 2012.

(51) Int. Cl.
- *A62C 13/62* (2006.01)
- *B05B 7/26* (2006.01)
- *B01F 15/04* (2006.01)
- *G05D 11/13* (2006.01)
- *B05B 7/00* (2006.01)
- *B05B 7/04* (2006.01)

(52) U.S. Cl.
CPC ............ *B05B 7/26* (2013.01); *B01F 15/042* (2013.01); *B05B 7/0018* (2013.01); *B05B 7/0408* (2013.01); *G05D 11/132* (2013.01)

(58) Field of Classification Search
CPC .. B05B 7/2408; B05B 11/3011; B05B 7/2421; B05B 7/1495; B05D 1/02; B05D 1/34
USPC ............... 239/302–308; 427/426; 73/864.16
See application file for complete search history.

(56) References Cited

U.S. PATENT DOCUMENTS

| | | | |
|---|---|---|---|
| 3,614,761 A * | 10/1971 | Rehm et al. | 367/83 |
| 4,113,182 A * | 9/1978 | Brago | 239/304 |
| 4,994,984 A * | 2/1991 | Massimo | 702/46 |
| 5,634,779 A * | 6/1997 | Eysymontt | 417/342 |
| 2007/0045445 A1* | 3/2007 | Hackel et al. | 239/146 |
| 2010/0038448 A1* | 2/2010 | Ghavami-Nasr et al. | 239/124 |
| 2012/0282121 A1 | 11/2012 | Kieffer et al. | |

OTHER PUBLICATIONS http://www.sprayworksequipment.com/pages/how_a_spray_foam_machine_works.html, SprayWorks Equipment Group, LLC, 2009-2013.
Graco Reactor—Air, Electric and Hydraulic Proportioners, Graco Inc., 2002-2007.

* cited by examiner

*Primary Examiner* — Len Tran
*Assistant Examiner* — Joel Zhou

(57) ABSTRACT

A modular plural component spray system configured for drawing at least two components, each stored in a discrete drum and sending the at least two components to a spray gun. The spray system comprises at least two flow lines. Each flow line includes a pump, a counter configured to measure the work performed by the pump and a heater disposed outside of each discrete drum downstream from the pump, where each of the two flow lines is configured to be connected at a first end to the spray gun and a second end to each discrete drum and each of the at least two components is drawn from each discrete drum and heated with the heater before arriving at the spray gun to be mixed and dispensed.

12 Claims, 12 Drawing Sheets

MODULAR PLURAL COMPONENT SPRAY SYSTEM

PRIORITY CLAIM AND RELATED APPLICATIONS

This non-provisional application claims the benefit of priority from provisional application U.S. Ser. No. 61/737,591 filed on Dec. 14, 2012. Said application is incorporated by reference in its entirety.

BACKGROUND OF THE INVENTION

1. The Field of the Invention

The present invention is directed generally to a modular plural component spray system. More specifically, the present invention is directed to a modular plural component spray system where each component is transported to a spray gun without requiring a transfer pump.

2. Background Art

Spray foam has been in use for about 50 years. Polyurea/urethane fast-set elastomeric coatings have been in use for about 20 years. For coatings and the like, two-part self-setting compounds may be mixed in a desired ratio and applied to the target surface or part. Compounds react quickly, yet the foam or coatings are sprayed at typically from 1-3 Gallons Per Minute (GPM). In most applications, the components mix within the plural component spray gun just before exiting to the target surface.

One of the biggest complaints about current spray foam equipment is that the equipment is difficult to learn to use, and is prone to failure due to too many electronics and related equipment that is not easy for the layman contractor/sprayer to troubleshoot and fix. Down time of spray foam equipment is costly, and can prevent timely completion of projects. Moreover, replacement parts are expensive and may require significant lead times to acquire.

Another problem in the industry is that most modern proportional spray foam systems do not provide the desired ratio of components, for example a 1:1 by volume ratio for the spray components. Typically, current systems therefore deliver a mixture that does not have the proper stoichiometry or the best physical properties of the components. Another disadvantage of prior art systems is that they frequently heat the components while they are still in the drum, which can cause problems. For example, heating the components prior to pumping will lower the viscosities and can cause striation, resulting in premature expansion of the B resin foam, which is then impractical to pump. The lowered viscosity may also cause leaking at the pump seals.

Yet another disadvantage of prior art systems is the use of pneumatic drive systems for the pumps, requiring a large volume of pressurized air. Suitable pneumatic systems are noisy, dirty and require larger air compressors.

Particular illustrative examples of applications for spray foam systems include, without limitation, (i) building insulation; (ii) roofing insulation; (iii) marine craft floatation material and motor vehicle crash space volumes; (iv) pipe insulation; (v) foam molding of parts, including for example wave boards; (vi) insulation for commercial freezers and refrigeration systems; (vii) commercial specialty building domes that are otherwise difficult to insulate; (viii) concrete leveling; (ix) prosthetic bones for training; (x) flotation items, including for example docks; (xi) props for type entertainment centers, for example fake rocks for resorts; (xii) military tent insulation; and the like.

Particular illustrative example of applications for polyurea/urethane elastomeric coatings include, without limitation: (i) floors; (ii) pickup truck bed liners; (iii) secondary containment, for example sewage clarifiers; (iv) military bullet proofing and bomb-fragment protection; (v) roof coatings; (vi) injection molding; and the like.

Both the spray foam industry and the polyurea/urethane elastomeric coatings industry use the same or similar equipment, and are collectively referred to herein as "spray foam equipment," "spray system" or similar phraseology. Typically, polyurea/urethane elastomeric coatings simply use higher heat and pressure.

U.S. Pat. Pub. No. 2012/0282121 of Kieffer et. al. (hereinafter Kieffer) discloses a plural component pump system for delivering plural liquid components at a selected ratio. The pump system includes a first brushless DC motor configured to drive a first pump that pumps a first liquid component to an output and a second brushless DC motor configured to drive a second pump that pumps a second liquid component to the output. The pump system includes a first controller configured to control the first motor and a second controller configured to control the second motor. The pump system also includes a communication interface between the first controller and the second controller. The first controller is configured to send a signal to the second controller using the communication interface and the second controller is configured to control the second motor based on the signal to deliver the first and second liquid components to the output at the selected ratio.

Each of Kieffer's electric motor cam driven piston pumps is driven by an electric motor of the on-off type. When such a piston pump receives a demand for a component, the motor coupled to the pump is turned on, causing a short cam action drive of the piston pump. Such a pump includes a very short stroke length, e.g., a GRACO® reactor having a 1¼" cam to give only a 2.5" full stroke length. Kieffer's pump has limited draft and can only siphon a very short distance with the pump (602 or 604 of Kieffer) mounted directly atop a drum (608 or 610 of Kieffer). As each of Kieffer's pumps is an on-off type pump capable of operating at fixed speeds only, in order to control Kieffer's pump speed to result in a different flow rate, Kieffer's pump would need to be stopped and started numerous times, causing undesirable pulsations revealed at a spray gun receiving the component from the pump.

Another characteristic of Kieffer's electronic motor cam driven piston pump has to deal with its output. The piston of such a pump is smaller and therefore causes much lower output per unit time. Upon examination of a pump chart documenting a volume flow to pressure, it shall be apparent that the flow pressure falls off quickly in relation to the volume of liquid moved as shown in FIG. 1. Kieffer's motors are small and do not have the capabilities to deliver larger volumes of fluids. Kieffer's pump is only capable of from about 0.5 to 0.7 GPM, a very low output compared to a hydraulic reciprocating piston pumps at about 2.5 GPM. In the plural component delivery industry, a pump used for delivering a component needs to be three times the volume output of the gun in order to deliver the volume and pressure up to about 3,500 Pounds Per Square Inch (psi). Further, most conventional spray guns used for the foam and coating industry include orifice sizes of from about 1 to 2.5 GPM. Kieffer's pump is incapable of providing sufficient flow for orifices with such sizes.

Yet other types of pumps have been attempted but all fail to satisfy consumer needs as the materials being pumped (e.g., isocyanate, etc.) in the coating industry have great tendencies to cause clogging of moving parts of the pumps. Among pumps which have been attempted but found to be undesirable, are positive displacement pumps such as axial piston and gear pumps.

Other undesirable setups of spray systems include a flow line having multiple pumps which not only add complexity to the setups as compared to a flow line with only one pump, but also causes the operation of a first pump to interfere with the operation of a second pump in the same flow line. The multi-pump per flow line setups such as those disclosed in the following website represent conventional plural component spray systems: http://www.sprayworksequipment.com/pages/how_a_spray_foam_machine_works.html There arises a need for a modular plural component spray system which is capable of meeting the volumetric flowrate of plural components of at least from about 3 to about 4 GPM and can be operated without pulsations and other negative flow effects.

SUMMARY OF THE INVENTION

The present invention meets the above-identified needs by providing a modular plural component spray system configured for drawing at least two components, each stored in a discrete drum and sending the at least two components to a spray gun. The spray system comprises at least two flow lines. Each flow line includes:
  (a) a pump;
  (b) a counter configured to measure the work performed by said pump; and
  (c) a heater disposed outside of each discrete drum downstream from said pump, where each of the two flow lines is configured to be connected at a first end to the spray gun and a second end to each discrete drum and each of the at least two components is drawn from each discrete drum and heated with the heater before arriving at the spray gun to be mixed and dispensed.

In one embodiment, each of the pumps is an independent flow hydraulic reciprocating piston pump.

Suitable counters include a manual or electric cycle counters.

The present spray system further includes a check valve disposed on the first end to prevent pulsation of each of the at least two components at the first end.

The present spray system further includes a check valve disposed on the second end to prevent cavitation of each of the at least two components at the second end.

In one embodiment, each of the present pumps is independently driven and not functionally coupled to a pump of another flow line within the present spray system.

The present spray system further includes a valve for controlling the flow rate of each flow line. Suitable valves include any valves having a flow coefficient (Cv) of at least 0.63. In a preferred embodiment, a needle valve is used.

The present spray system further includes a bleed line coupled to an output of one of the pumps and one of the discrete drums.

Accordingly, it is a primary object of the present invention to provide a plural component spray system that is simple, easy to operate and capable of commercial applications without problems associated with component ratioing in prior art spray systems.

It is another object of the present invention to provide a plural component spray system that is free from component pulsation problems.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

Figure 1:
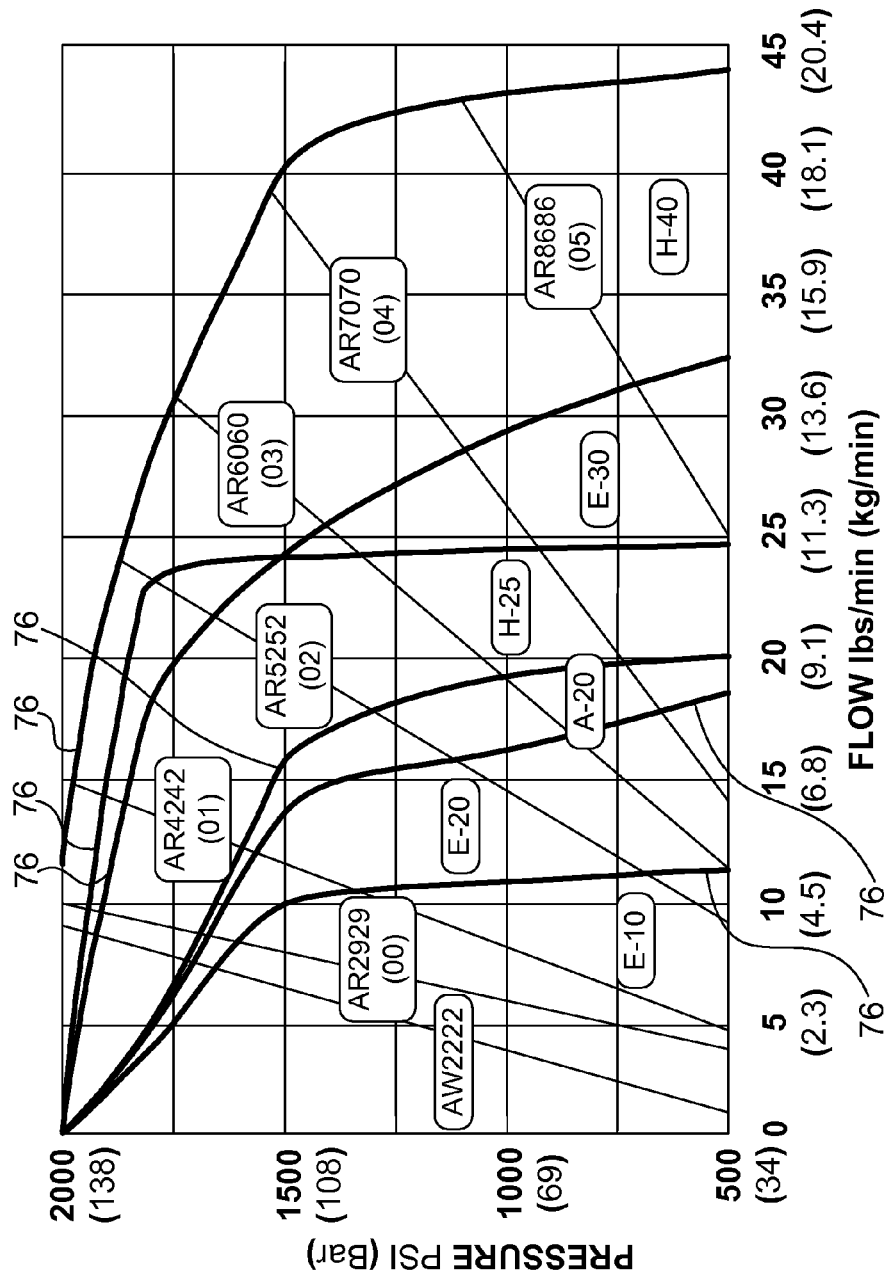
FIG. 1 is a chart depicting the relationship of between flow pressure with respect to the flow rate of a liquid in a flow line, depicting the inverse relationship between flow pressure and flow rate.

2—spray system
4, 6—drum
8—movable support
10, 12—hydraulic reciprocating piston pump
14, 16—cycle counter
18, 20—heated hose 22—control system
24—blocks
24A—first block
24B—second block
26A, 26B—serpentine channel
28A, 28B—inlet port
30A, 30B—Outlet port
32A, 32B—mating channels
34, 36—check valve
38—inlet check valve
40—outlet check valve
42—piston of pump
44—screen
46, 48—electric motor driven piston pump
50, 52—transfer pump
54—bleed line
56—valve of bleed line
58—flow control valve
60—heater
62—common drive motor for pumps of prior art spray system
64—spray gun
66—heating by means for sending fluid through springs and fire rods
68—insulated preheater
70—empty column
72—hydraulic power system
74—motor (engine or electric motor)
76—pump curve
78—helical ribbon

PARTICULAR ADVANTAGES OF THE INVENTION

The present pumps are independently driven, unlike prior art pumps which are commonly driven. When pumps are commonly driven, differences in viscosities and flow characteristics of two or more fluid components can cause fluid components of different volumes being mixed, causing unpredictable and undesired mixture properties.

Compared to conventional plural component spray systems utilizing transfer pumps, the present system simplifies the processing of the components, e.g., Isocyanate (ISO) and resin components, by eliminating the transfer pumps and all their related low-pressure problems. As the present system requires only one pump for each flow line, a costly pump-line system assembly can be avoided. Complicated electronics of the prior art used to ensure certain ratios of components can be avoided, eliminating costs associated with diagnosing failures, breakdown and repair of such equipment in the field, especially in the construction environment.

In prior art systems where each flow line includes a low pressure transfer or feed pump for drawing a component from a drum and supplying a downstream placed high pressure pump with such material, starvation of the component at the high pressure pump can occur. Air operated piston pumps and air operated diaphragm pumps are typically used as transfer pumps. No transfer pumps are used in the present spray system. If a transfer pump is used, directional changes of the larger downstream placed piston pumps can cause the flow pressure to drop from about 250 psi to about 70 psi, causing insufficient pressure to move fluid forward. Diaphragm pumps can have similar problems as their pressure can drop from about 120 psi to as low as about 40 psi during a cycle directional change. As a check valve of an electric motor driven pump requires about 60 psi to open to allow flow, insufficient pressure exerted by the transfer pump causes the check valve to close, momentarily preventing the material from being drawn and sent to the electric motor driven pump. When the transfer pump is on the directional change part of the cycle or stroke, the pressure drops to a very low pressure point. If an electric motor driven pump is requesting for and attempting to get material at this time, a condition called starvation can occur in the electric motor driven pump as it does not receive sufficient material compared to the amount requested. This condition can cause one flow line to go off ratio with another flow line, causing less than adequate mixture at the output or spray gun. This causes the electric motor driven piston pump to not get a full charge in its cylinder. If a component being drawn possesses a viscosity or flow coefficient that is significantly different than the other, a different amount of material may be drawn from each cycle of each electric motor driven pump. The speed at which the ball of a ball check valve closes can vary tremendously with the type of component being drawn. Generally, a component with higher viscosity is drawn in a lower quantity given the same number of strokes a pump makes. It is also well known in the plural component spray industry that with the use of every 8 to 10 sets of component, an extra set of the complementary component has to be used. Deviations of components from desired ratio are typically evidenced by the color and feel of the mixture of components. Often times, intangible disadvantages of such a ratioing problem also includes increased costs and less-than-ideal final or cured products.

Heating of components in prior art spray systems include the use of springs and fire rods (66 of FIG. 3) directly in components, where components come in direct contact with the heating elements which can cause local overheating of components that can lead to undesirable component properties. In contrast, in the present spray system, heating is carried out in blocks (large masses) receiving heat from heaters, thereby isolating components being heated from direct exposure of heating elements. Further, in the present spray system, the heating of components is configured to occur outside of the drums in which the components are held. Heating lowers the viscosities of components and can cause striation, resulting in premature expansion of the B resin foam, which is then impractical to pump. The lowered viscosity may also cause leaking at the pump seals. Striation involves separation of subcomponents in each component due to different specific gravity values of the subcomponents. Upon heating in a drum, subcomponents having lower gravity tend to float to the upper levels of the drum while subcomponents having higher gravity tend to float to the lower levels of the drum. If a component is heated before it is drawn from a drum, initial suction will cause suction of heavier subcomponents to be moved first as the opening of the siphon tube is disposed at or near the bottom of the drum. Improper mixture of subcomponents can cause the mixture at the spray gun to not result in desired amounts of subcomponents and ratioing of the components.

A hydraulic reciprocating piston pump is used in each flow line of the present spray system. The piston of a hydraulic piston pump is driven by a hydraulic motor (or another device capable of generating sufficient hydraulic fluid pressure to drive the piston of a piston pump up and down in linear motion and not a rotary-to-linear motion as in Kieffer's cam driven pump or other prior art high pressure pumps) which is in turn driven by an electric motor. In contrast, each of Kieffer's pump is driven directly with an electric motor having a rotary portion. This rotary portion is a cam drive system that translates a rotary motion of the rotary portion to a short non-linear straight line motion. In other words, the piston strokes are short in Kieffer's pump. Further, as prior art pumps are commonly controlled, these pumps are moving identically. Therefore, if the conditions which cause the pumps to pump off ratio exist, materials will continue to be moved off ratio.

The present spray system further includes a screen disposed at the intake of a flow line in each drum. In prior art spray systems, components from drums are moved into pumps unfiltered. Chunks of components can form in drums and foreign particles may also be present in drums due to contamination pre or post filling of the drums. These undesired materials can get lodged on the check ball seats, preventing one or more check valves in the flow line from functioning properly.

The present spray system is easy to use and suitable for commercial applications. In using present hydraulic reciprocating piston pumps for a spray gun, the pressure at which the spray gun operates at is first set. The flow lines are then brought up to and held at this pressure by the piston pumps. Compared to conventional pumps, the present pump includes a significantly longer stroke at 4 inch, thereby offering much better drafting or siphon capabilities. Kieffer's pumps (602 or 604 of Kieffer) or other short stroke pumps must be mounted close to where a component is being drawn from a drum, e.g., directly atop a drum. The enhanced drafting capability of the present pump renders this requirement unnecessary, thereby enabling remote drafting or siphoning as the pump may be mounted at some distance from the drum.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

FIG. 1 is a chart depicting the relationship of flow pressure with respect to the flow rate of a liquid in a flow line, depicting the inverse relationship between flow pressure and flow rate. Upon examination of FIG. 1, it shall be apparent that the flow pressure falls off quickly in relation to the flow rate as shown in FIG. 1. Therefore, it is critical for the designer of a spray system to contemplate the effects of increasing flow at the expense of pressure and vice versa (see pump curves 76). Although it has been disclosed in Kieffer that its components may be sprayed at a relatively high pressure of 3200 psi (see Paragraph 18 of Kieffer), Kieffer fails to disclose a volumetric flow rate suitable for most commercial applications.

Figure 2:
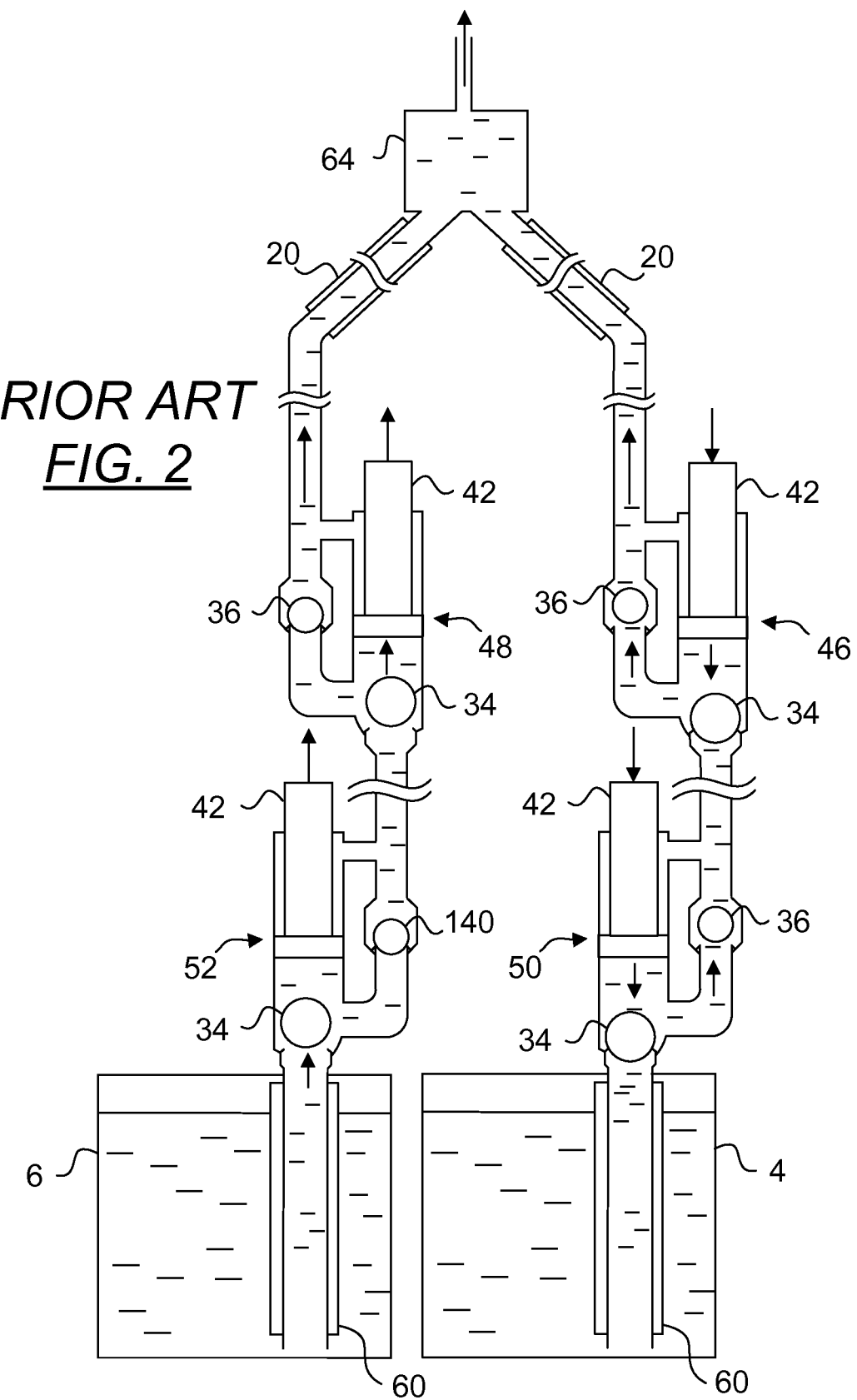
FIG. 2 is a diagram depicting a plural component spray system with two conventional flow lines, each moving a component from a drum with two pumps.
Figure 3:
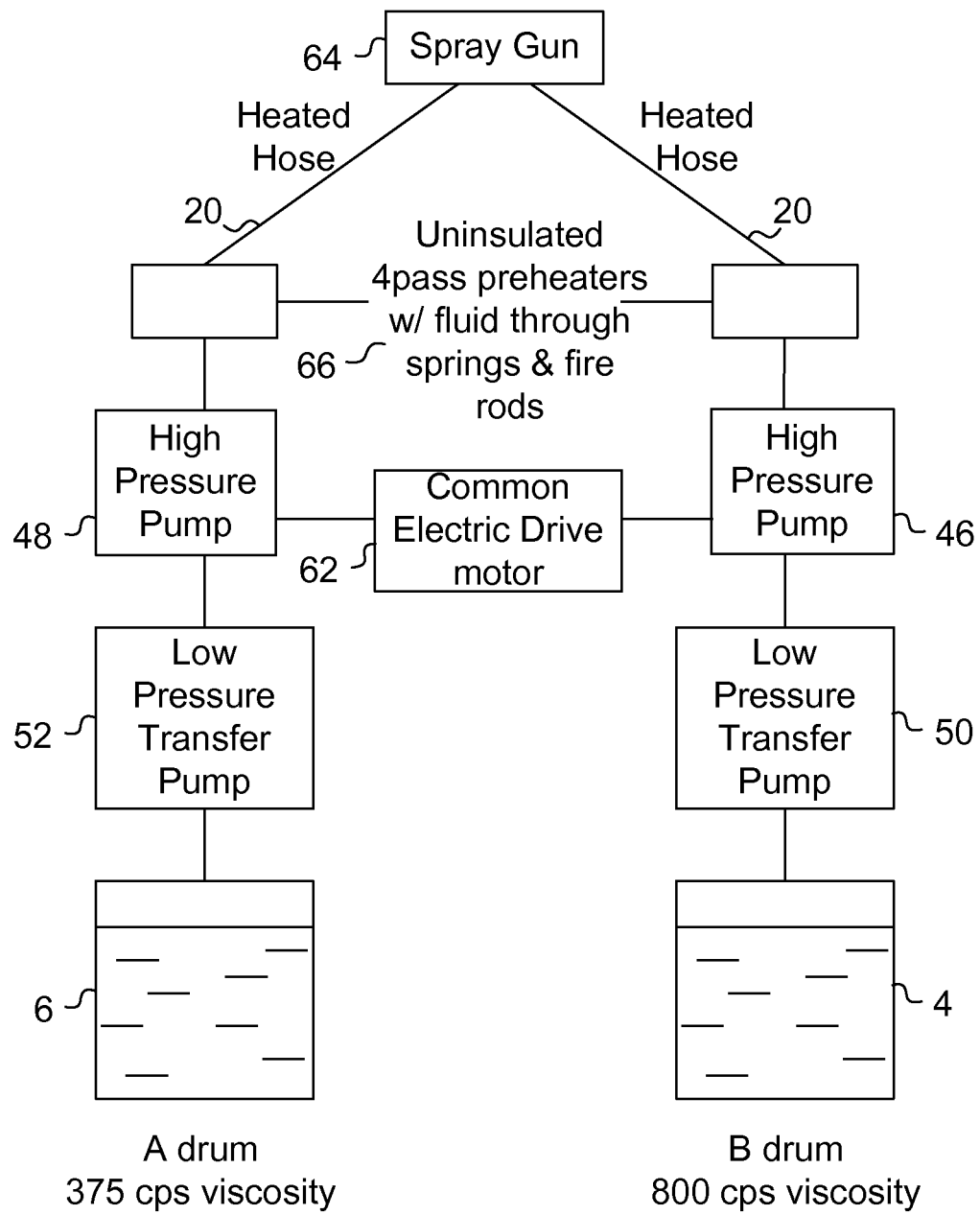
FIG. 3 is a block diagram depicting a plural component spray system with two conventional flow lines, each moving a component from a drum with two pumps.

FIG. 2 is a diagram depicting a plural component spray system with two conventional flow lines, each moving a component from a drum with two pumps, i.e., one high pressure electric motor driven pump 46, 48 and one low pressure transfer pump 50, 52. FIG. 3 is a block diagram depicting a plural component spray system with two conventional flow lines, each moving a component from a drum with two pumps. It shall be noted that in each flow line, two pumps are used to move a component from a drum 4, 6. For drum 4, transfer pump 50 is used to draw the fluid contained in drum 4 and send it to the electric motor driven pump 46. For drum 6, transfer pump 52 is used to draw the fluid contained in drum 6 and send it to the electric motor driven pump 48. It shall be noted in this example that there is a possibility that piston pumps are used as the electric motor driven pumps 46, 48 and the transfer pumps 50, 52. Therefore, it is possible during operation that a pump may function in a transient state that is unfavorable to the transient state of the other pump in the same flow line. Referring to FIG. 2, it is possible that the piston 42 of a transfer pump, e.g., 50 is transitioning to a downstroke position while the piston 42 of the electric motor driven pump, e.g., 46 is transitioning to a downstroke position. The downstroke of electric motor driven pump 46 causes check valve 34 to close while a downstroke of transfer pump 50 causes a tendency to push check valve 34 open. Transfer pump 50 therefore works against electric motor driven pump 46. Another condition may occur where the transfer pump 52 is transitioning to an upstroke position while electric motor driven pump 48 is also transitioning to an upstroke position. Under this condition, electric motor driven pump 48 is requesting more fluid as check valve 34 is opened. This effort is hampered as check valve 36 is now closing, preventing electric motor driven pump 48 from getting a full charge. The problems associated with multiple pumps working against each other are especially apparent in systems with short hoses. Hoses, especially those that are flexible, are capable of adjusting to the volumetric flowrate fluctuations caused in such problems. Referring to FIG. 3, prior art pumps are commonly driven using a common drive motor 62. If the pumps 46, 48 are moving components off ratio, no corrective actions are taken as the pumps are simply driven without feedback.

Figure 4:
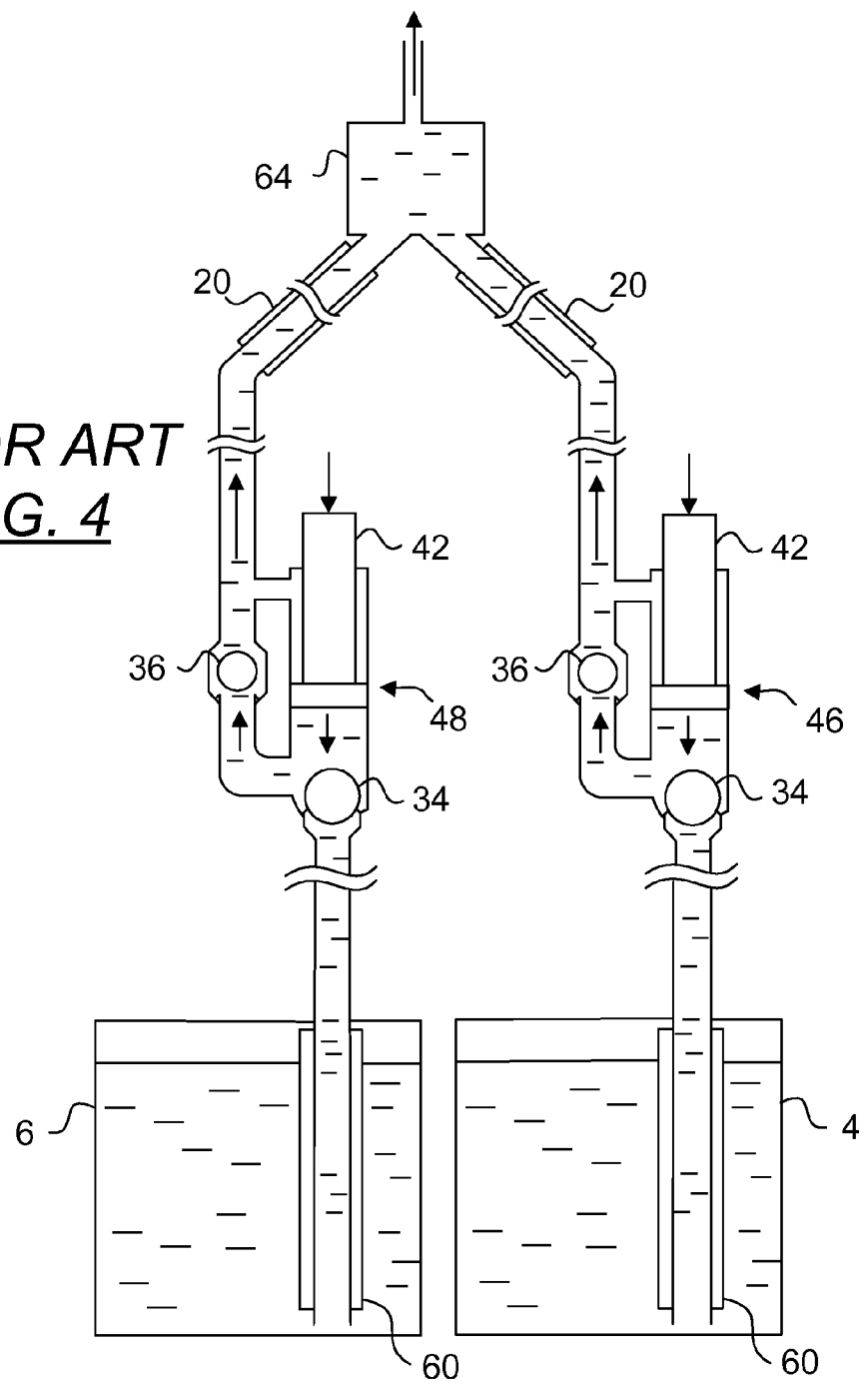
FIG. 4 is a diagram depicting another plural component spray system with one conventional flow line, each moving a component from a drum with one pump.

FIG. 4 is a diagram depicting another plural component spray system with conventional flow lines, each moving a component from a drum with one pump such as one disclosed in Kieffer. It shall be noted that in this example, no transfer pumps are used. An electric blanket 60 may be disposed around an inlet tube disposed in each drum. Without a check valve such as one disposed at an outlet of a flow line (see outlet check valve 40 of FIG. 6), a material moved through a first flow line has a tendency of entering a second flow line via the outlet of the second flow line if the pump of the second flow line has ceased to function, capable of causing severe clogging if the foreign component reacted with the native component. The use of an outlet check valve limits such potential and also reduces pulsation experienced in the spray gun 64 when the directional changes in the pump of one flow line affect the flow of the other flow line.

Figure 5:
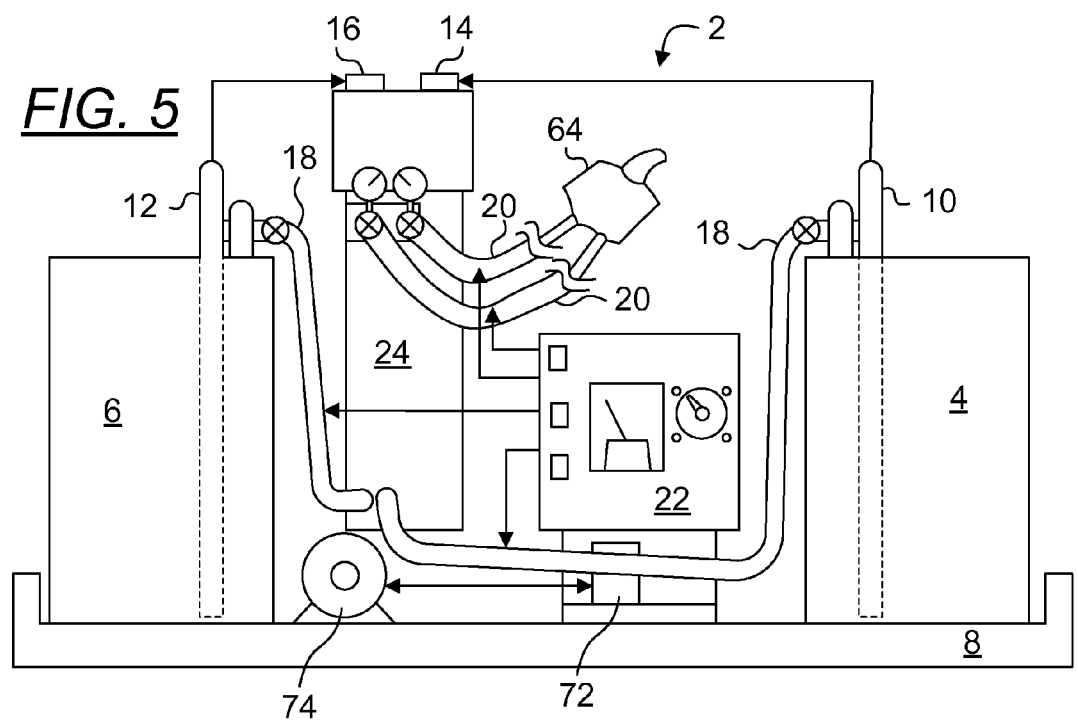
FIG. 5 is a diagram depicting one embodiment of the physical layout of the present plural component spray system.

FIG. 5 is a diagram depicting one embodiment of the physical layout of the present plural component spray system 2. The plural component spray system 2 in this embodiment includes a movable support 8, for example a wheeled cart, a sled, a pallet or the like. In the embodiment of FIG. 5, the movable support 8 is sized to support the plural component spray system 2 and at least two drums 4, 6 of components, for example a drum 4 containing a catalyst such as an isocyanate or ISO and a drum 6 containing a resin. A first hydraulic reciprocating piston pump 10 is inserted into the ISO drum 4, and operable to pump components directly from the ISO drum 4. A second reciprocating hydraulic pump 12 is inserted into the resin drum 6, and is operable to pump components directly from the resin drum 6. It will be appreciated that the pumps 10, 12 pump component directly from the corresponding drums 4, 6, prior to the components being heated, which is advantageous. The components are pumped to high pressures, for example in the range of 2,500 psi to 5,000 psi. In an exemplary application the pumps 10, 12 are configured to be operable to approximately 3,500 psi. Examples of a hydraulic reciprocating piston pump suitable for the present spray system include TITAN® 8900, TITAN® 12000, GRACO® GH-230, GRACO® GH-300 and ARO/INGERSOLL RAND® 650945-C43-B. Although hydraulic reciprocating piston pumps are preferred, it will be appreciated that other pump types, for example pneumatic pumps, may alternatively be used for some applications although much less desirably.

Each of the hydraulic reciprocating piston pumps 10, 12 is coupled with a cycle counter 14, 16, such that a user can monitor the work performed, e.g., pump cycles or piston cycles of a piston pump, for example, to ensure that a desired pumping ratio is approximately achieved. In prior art systems, a counter may be coupled directly to an electric motor for calculating the cycles of the electric motor which may be quite different than the actual cycles that are made by a hydraulic pump due to its independent operating cycles and strokes. Both of the individual flow line pumps must be of the same size and volume. In a current embodiment, multiple cycle counters are provided for each pump, including an electronic cycle counter and a mechanical cycle counter. In one example, 40 cycles at the cycle counter is equivalent to a gallon of component moved.

A hydraulic power system 72, including a motor 74, such as an electric motor or a gas engine is operatively configured to drive a hydraulic motor which in turn drives the first and second pumps 10, 12. However, it should be appreciated that the pumps may be driven by any convenient power source as long as the eventual mover of the pump is hydraulically driven. For example, one or more electric motor, one or more air compressors, one or more hydraulic power packs, etc., although air compressors are less desirable as air is quite compressible and can cause pulsations in the flows of material. The cycle counters 14, 16 monitor the pumps 10, 12 directly. As discussed elsewhere herein, a mechanical or electrically driven valve 58, in each flow line allows the user to adjust the relative flow rates from the pumps 10, 12 based on the pump piston cycles, to achieve a true 1:1 (or other desired) component ratio.

In one embodiment, a 5 Horsepower (HP) electric motor drive hydraulic power pack 72 is preferred for the higher pressure spraying of polyurea/urethane, elastomeric coatings and the like. A 5 HP electric motor hydraulic power pack 72 provides sufficiently large output to better handle both pumps 10, 12, as well as operating a hydraulic drum mixer for mixing the B resin component when spraying polyurea. In a current embodiment, the 5 HP electric motor 72 is also capable of supplying enough pressure and volume to other hydraulic accessories, for example a hydraulic plane for shaping spray foam before coating, or the like. The pumps 10, 12 may be drum mounted, mounted on a stand, or wall mounted with quick disconnects.

Figure 6:
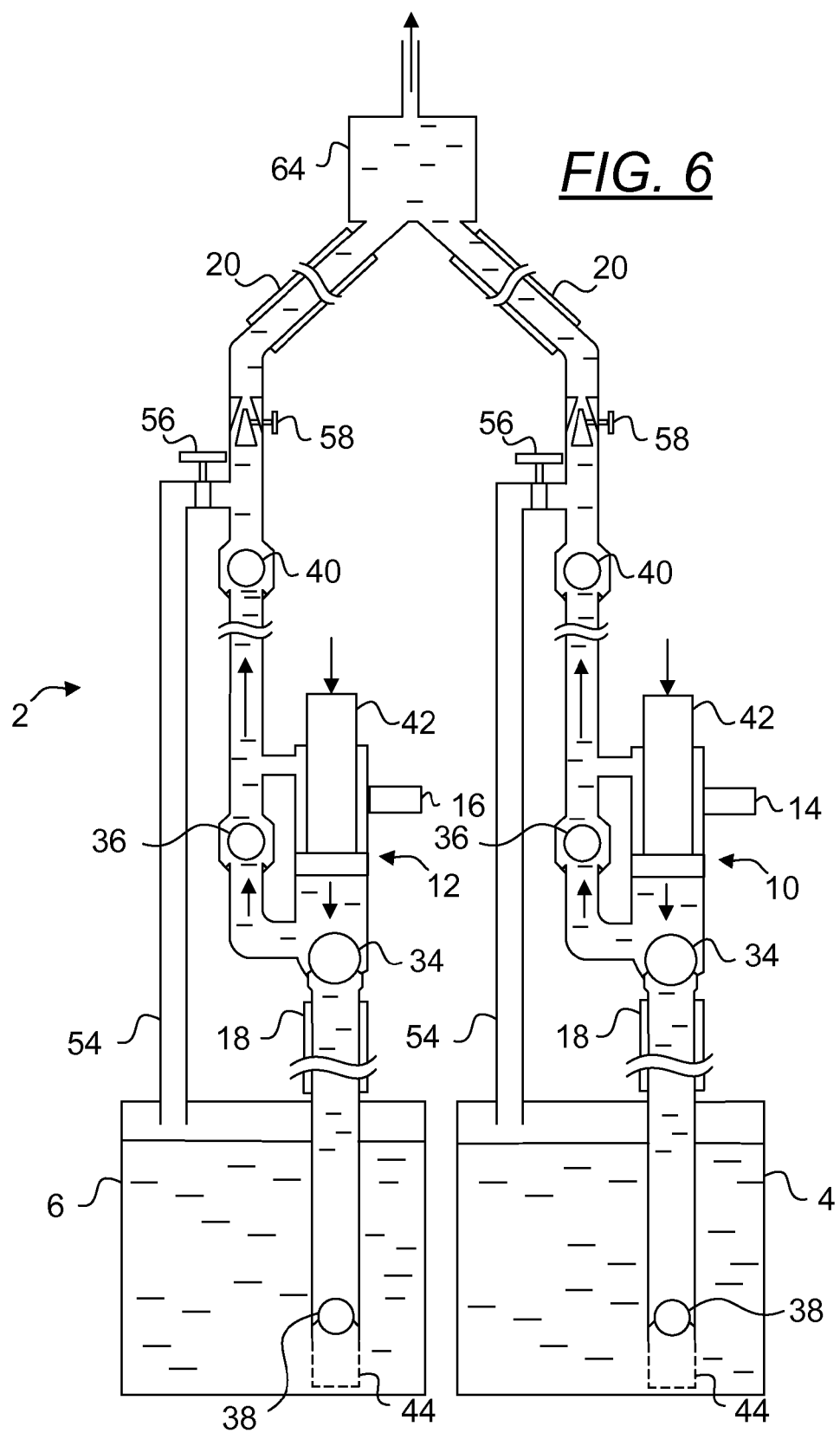
FIG. 6 is a diagram depicting one embodiment of the present plural component spray system with two flow lines, each moving a component from a drum with only one pump.
Figure 7:
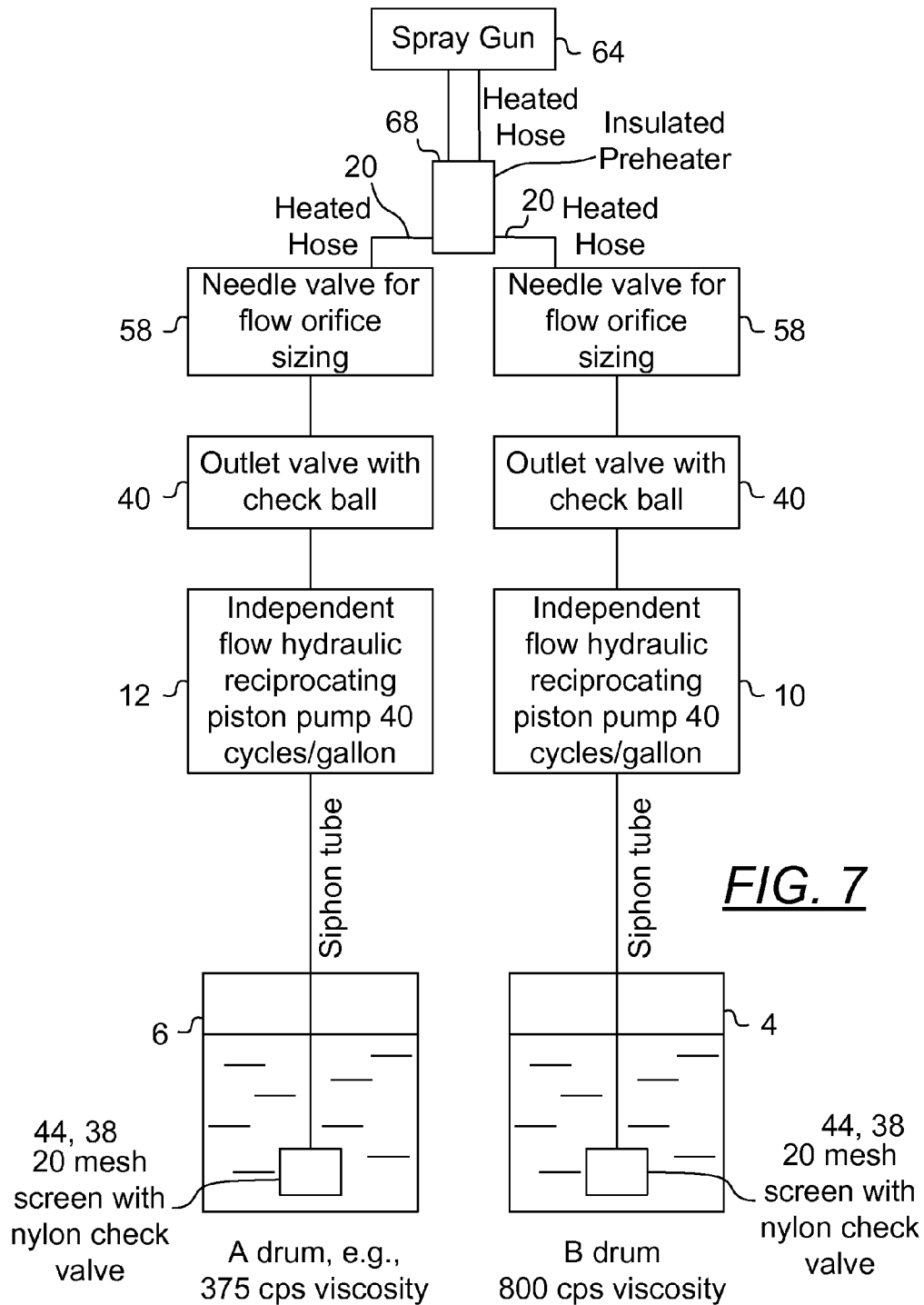
FIG. 7 is a block diagram depicting one embodiment of the present plural component spray system with two flow lines, each moving a component from a drum with only one pump.

FIG. 6 is a diagram depicting one embodiment of the present plural component spray system 2 with two flow lines, each moving a component from a drum with only one pump. FIG. 7 is a block diagram depicting one embodiment of the present plural component spray system 2 with two flow lines, each moving a component from a drum with only one pump. An inlet check valve 38 that is mounted at the tip of a siphon tube is particularly suitable and advantageous for the present system 2. Any pump has a limited draft, and is prone to cavitation if it loses its prime. The unique inlet check valve 38 comprises a 20 mesh stainless steel screen 44 to filter particles, and a nylon check ball valve system disposed at the bottom of the siphon tube. The limited suction of the piston pumps 10, 12 are still able to easily lift this non-spring loaded nylon ball, which still closes, to keep material in the siphon tube, preventing cavitation of the pump. It has been found that this unique combination of the inlet check valve 38 and the screen 44 makes a significant difference in keeping a prime in the pumps 10, 12. It should be appreciated that the pumps 10, 12 pump components directly from the drums 4, 6, which are not heated. This configuration avoids problems sealing and premature foaming problems that can be found in systems that heat the components prior to pumping. In addition, the present configuration eliminates the need for low-pressure transfer pumps and related hoses that are found in prior art systems.

The first and second pumps 10, 12 pump the components into corresponding first heated hoses 18, which provide a first stage heating of the pumped components. In the current embodiment, the first stage heating is selectively controllable by the user through the electric power and control system 22. The first stage heating may be turned off by the user, for example when the equipment is being used in a warm environment. Alternatively, the first stage heating may be adjusted to a selectable power setting to heat the components to a desired temperature. A thermocouple (not shown) is provided near the output of each of the heated hoses 18, and is monitored and displayable on a display on the electric power and control system 22.

The first heated hoses 18 deliver the components to a preheater 24, which provides a second stage heating to the pumped components. In the current embodiment, the preheater 24 may be a dual-mode, thermal mass preheater 24, configured to preheat the pumped materials with a plurality of cartridge heaters, with a hot water system, or with a combination of a cartridge heaters and a hot water system. The preheater 24 is discussed in more detail below.

Although this example assumes operationally identical pumps 10, 12 and 1:1 proportioning ratio, the idea is readily extended to systems with dissimilar (but known) pumps and/or to systems wherein a different ratio of components is desired.

In one embodiment, the flow rate of one or both of the components is controlled by providing a valve 58 having a flow coefficient of at least 0.63 at turns open on the outlet line, and adjusting the valve. In one embodiment, valve 58 is a straight through, plug type needle valve. Separate cycle counters 14, 16 are operatively connected to a corresponding one of the pumps 10, 12. As an example, consider the system 2 with pumps 10, 12 that are identical (or operationally similar), and wherein the system 2 is configured to proportion the two components equally by volume. In prior art systems, it is very difficult to obtain a desired ratio of components, which can result in very poor quality foam (or other output) and wasteful use of materials and increased downtime because one component may be exhausted before the other. When setting up and initially using the system 2, the user may monitor the pump cycle counters 14, 16. If one pump is cycling more quickly than the other, the user may simply adjust valve 58 to speed up, or slow down, a material flow in a flow line. Automatic adjustment of one valve 58 may also be made against another by receiving the separate inputs of the cycle counters 14, 16 and reacting to such inputs. For instance, if cycle counter 16 reports an excessive amount of material from drum 6 as determined via the preset ratio of the two components, valve 58 of drum 6 may be automatically and momentarily adjusted to reduce the flow rate from drum 6. Further, the present spray system includes a bleed line 54 coupled to an output of one of the pumps. A valve 56 is disposed within the bleed line 54 to selectively enable the return of a pumped component to its corresponding drum. A bleed line, which is absent in prior art spray systems, enables one to test the portion of a flow line including a pump before a component is sent to the spray gun 64 where the component is mixed with a second component, i.e., the point of no return. Mixed components must be discarded from the spray gun or the mixture may harden in the spray gun, rendering it permanently inoperable. By enabling one to test a portion of a flow line, the possibility of producing a mixture of poor ratio and therefore potential wastes and costs can be reduced.

Figure 8:
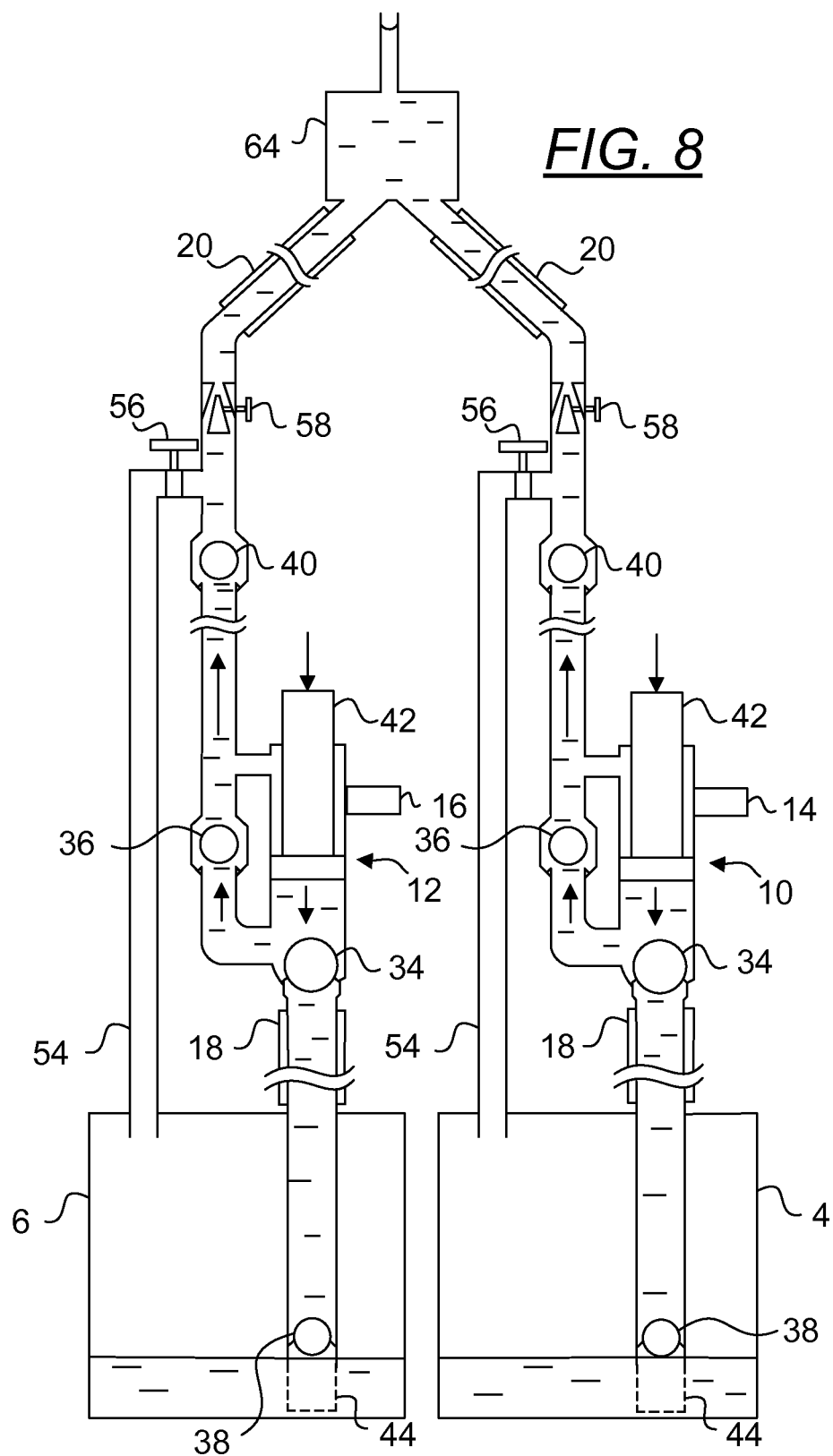
FIG. 8 is a diagram depicting one embodiment of the present plural component spray system with two flow lines, each moving a component from a drum with only one pump and low with the component.
Figure 9:
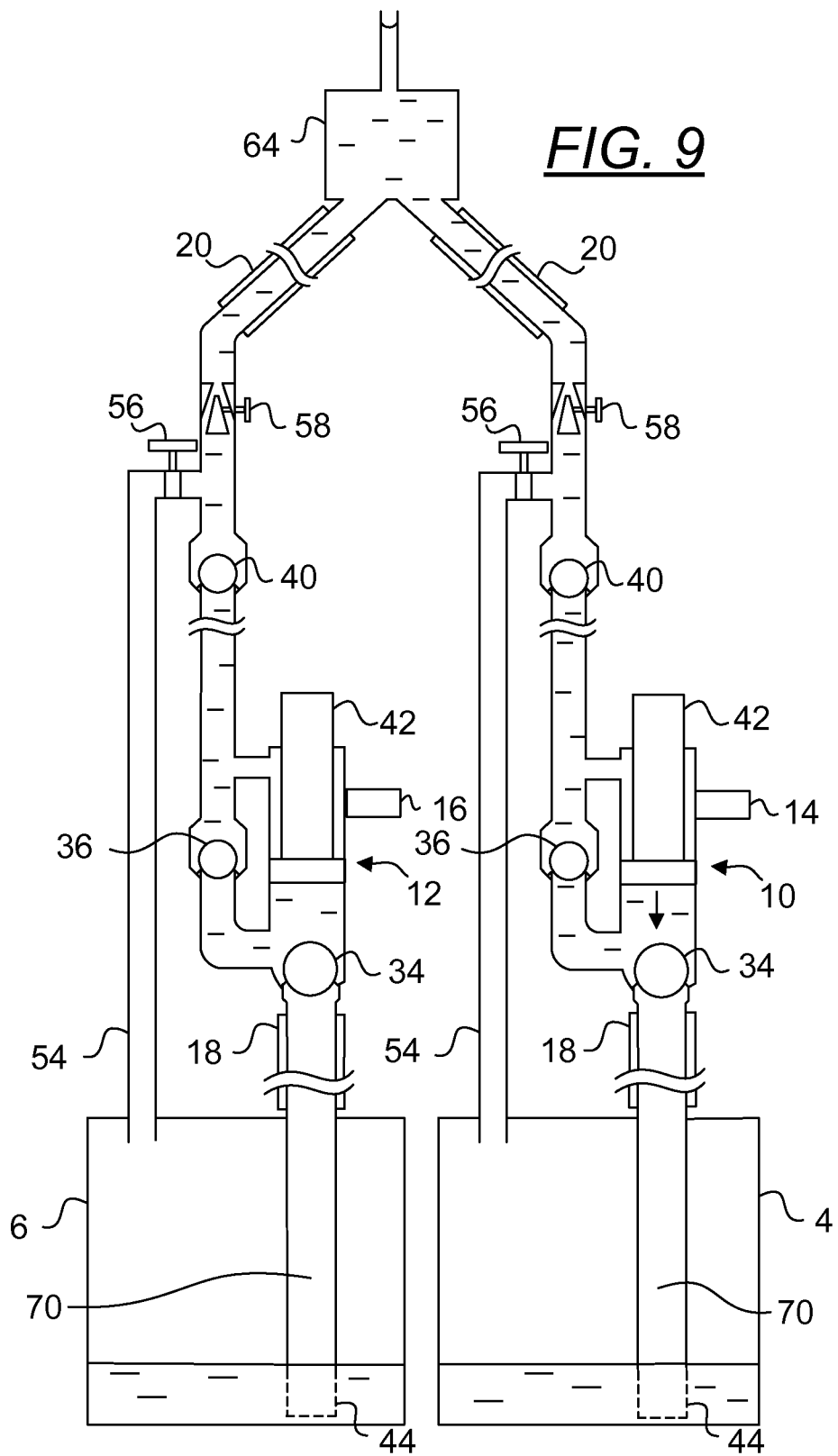
FIG. 9 is a diagram depicting the effect of not using an inlet check valve in a flow line, depicting the loss of component in portions of the flow line if operation of its pump is ceased.

FIG. 8 is a diagram depicting one embodiment of the present plural component spray system with two flow lines, each moving a component from a drum with only one pump and low with the component. FIG. 9 is a diagram depicting the effect of not using an inlet check valve in a flow line, depicting the loss of component in portions of the flow line if operation of its pump is ceased. When a component is getting depleted, the level of the component may not be sufficient to maintain sufficient prime in the flow line. It shall be noted that, with the use of an inlet check valve 38, the column of component above the check valve 38 is maintained as the seated check valve 38 prevents the column from dropping below the check valve 38, therefore maintaining sufficient prime in the flow line. When pumping is again resumed, the pump is already primed and therefore can continue to siphon the remaining component in the drum without drawing one or more columns of air into the flow line before a proper flow can be established. It shall be clear from FIG. 9 that, without an inlet check valve 38, siphoning cannot continue without drawing in one or more columns of air as the column of component cannot be maintained in the portion of the flow line upstream from the pump.

Figure 10:
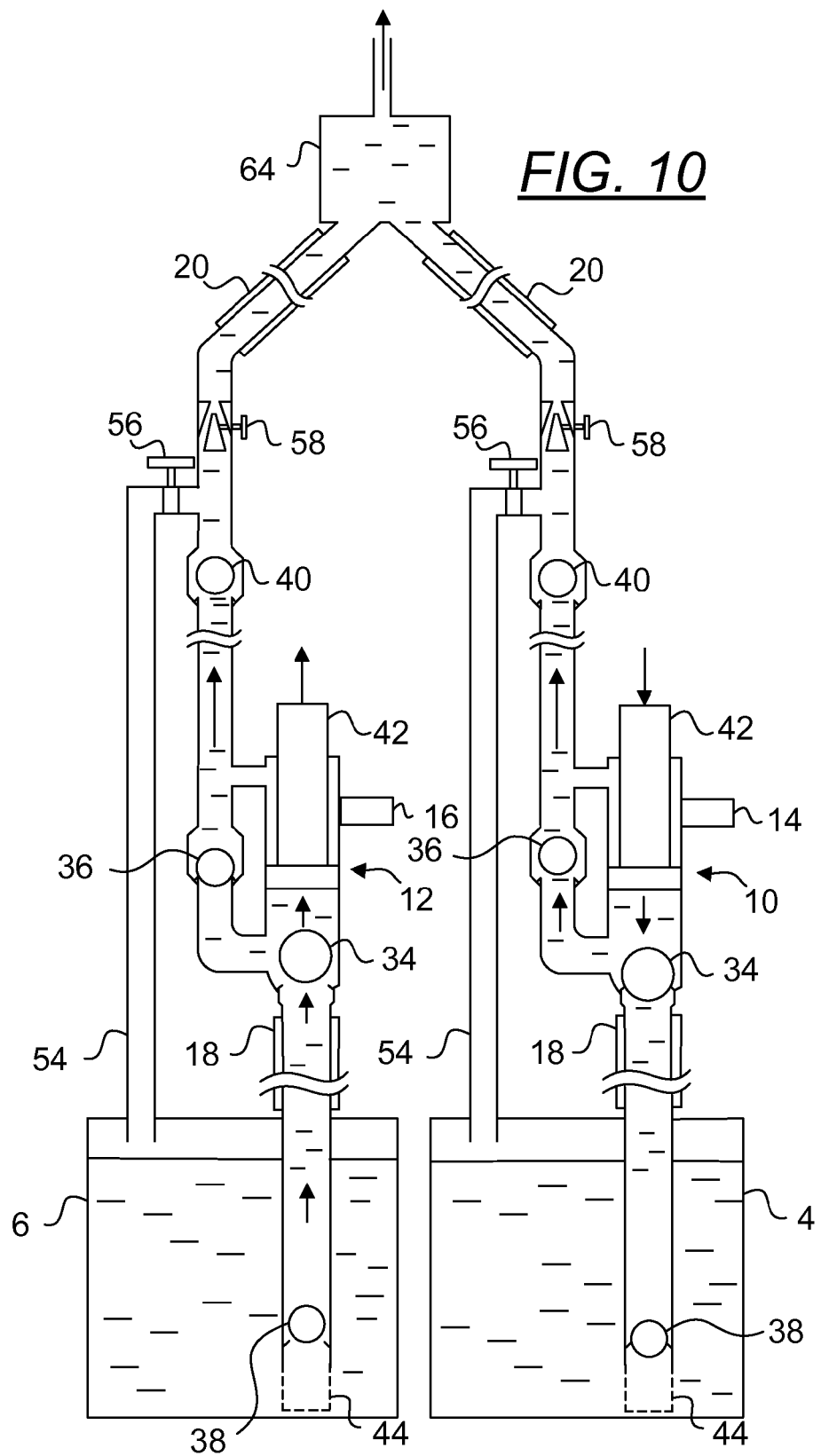
FIG. 10 is a diagram depicting the embodiment of the present plural component spray system of FIG. 8 with the piston pump of drum 6 disposed in the upstroke position.
Figure 11:
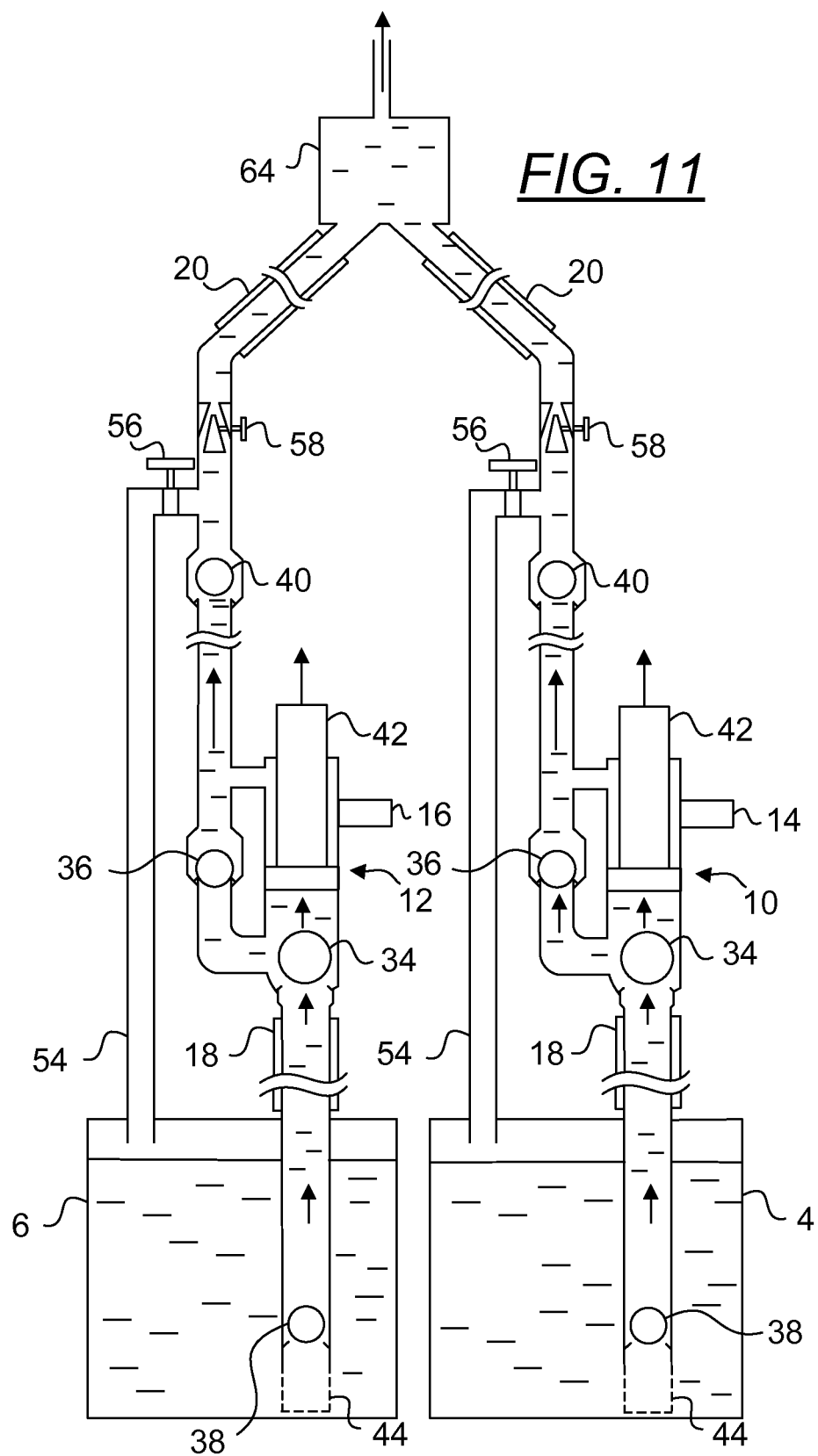
FIG. 11 is a diagram depicting the embodiment of the present plural component spray system of FIG. 8 with both the piston pumps of drums 6 and 4 disposed in the upstroke position.

FIG. 10 is a diagram depicting the embodiment of the present plural component spray system of FIG. 8 with the piston pump of drum 6 disposed in the upstroke position. FIG. 11 is a diagram depicting the embodiment of the present plural component spray system of FIG. 8 with both the piston pumps of drums 6 and 4 disposed in the upstroke position. It is apparent, upon viewing FIGS. 10 and 11 that the use of inlet and outlet check valves 38, 40 impart no negative effects to a flow line as the check valves 38, 40 would simply open or close in response to pressure changes upstream and downstream of the check valves 38, 40.

Figure 12:
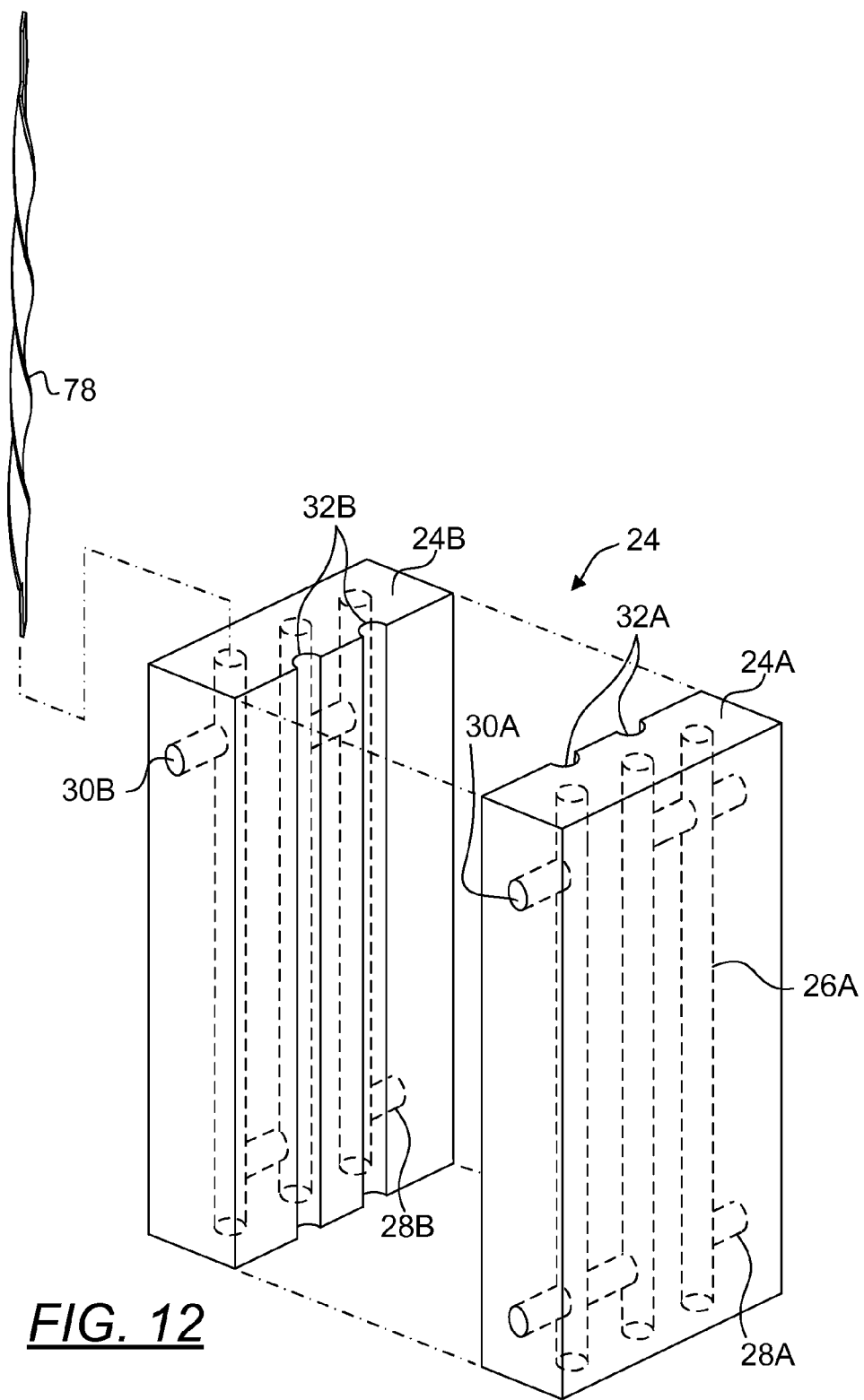
FIG. 12 is a partially exploded view of the preheater shown for the system in FIG. 8.

The pressurized and heated components exiting the block-type preheater 24 enter a third stage heating in heated hoses 20 that transport the heated components to a delivery device such as a plural component spray gun 64. FIG. 12 illustrates a partially-exploded view of the preheater 24. The preheater 24 in this embodiment is configured to receive and heat components from both of the drums 4, 6. The preheater 24 comprises a first block 24A defining a first serpentine flow channel 26A, and a second block 24B defining a second serpentine flow channel 26B. The blocks 24A, 24B are preferably formed from a material, for example aluminum or a similar metal, having high thermally conductivity and thermal mass. In a convenient construction, the serpentine channels 26A, 26B comprise three long portions or passes through the respective block, and may be formed by boring longitudinally and transversely through (or partially through) the block, and installing blocking elements (not shown) on one or both ends of the bored holes.

Inlet ports 28A, 28B near the bottom of the blocks 24A, 24B are provided and configured to receive a distal connector on the first heated hoses 18 to deliver the pressurized components to the respective flow channels 26A, 26B. Similarly, outlet ports 30A, 30B near the top of the blocks 24A, 24B are configured to receive a proximal connector or the second heated hoses 20.

A helical ribbon 78 (only one is shown in FIG. 12) is provided in the flow channels 26A, 26B, which causes the component flow through the channels to turn, thereby increasing the heat transfer from the blocks 24A, 24B to the respective component, and permitting the channels 26A, 26B to be larger in diameter. This preheater 24 has considerably less pressure drop than the conventional preheaters with cartridge heater and spring design.

The blocks 24A, 24B define mating channels 32A, 32B that cooperatively define elongate cylindrical channels that are configured to receive and retain heating elements, for example cartridge heaters (not shown, for example heating elements sold under the trademark FIREROD®). Cartridge heaters are tube-shaped, heavy duty, industrial heating elements that are typically inserted into drilled holes in a metal block for heating. In the disclosed embodiment, two channels for cartridge heaters are provided, and the current embodiment uses a 5,000 W cartridge heater, and a 3,000 W cartridge heater, both of which are individually controllable. Alternatively, one or both of the channels may be configured (e.g., with a through pipe or the like) to connect to a boiler or other source of heated water, and to use such alternative heating means. It is also contemplated that more or fewer heating channels may be provided.

It should be appreciated that the preheater uses a thermal mass heating system, wherein the blocks 24A, 24B are heated by the cartridge heaters, and they, in turn heat the components. Therefore, the components do not have to come in direct contact with the cartridge heaters, and are not exposed to the peak temperatures generated by the cartridge heaters. A unique aspect of the preheater 24 is that it combines both the components from drums 4 and 6 in one combined thermal mass preheater 24. The preheater also uses a dual insulation system around the preheater to improve efficiency and heat retention. In addition, a reflective outer layer keeps the maximum energy effectively heating the fluid components.

In the current system 2, a number of temperatures are monitored and may be used to control the three-stage heating system. The system 2 monitors the temperature of the 5,000 W cartridge heater, the temperature of the 3,000 W cartridge heater, the temperature of the blocks 24A, 24B, and temperature of the components exiting the channels 26A, 26B, and the ambient temperature. Based on the monitored temperatures, the electric power and control system 22 controls the power provided to the first heated hoses 18, the power provided to the cartridge heaters, and the power provided to the second heated hoses 20.

While the preferred embodiment of the invention has been illustrated and described, it will be appreciated that various changes can be made therein without departing from the spirit and scope of the invention.

What is claimed herein is:

1. A modular plural component spray system for spraying polyurethane spray foam and or polyurea/urethane fast-set elastomeric coating, polyaspartic coatings, or any two-component fluid materials that can be mixed by static or impingement mixing, where said modular plural component spray system is configured for drawing at least two components, each stored in a discrete drum and sending at least two components at a desired or variable ratio to a spray gun, said spray system comprising at least two flow lines, wherein each flow line is adapted to receive one of the at least two components, said each flow line comprising:

(a) an independently driven hydraulic reciprocating piston pump capable of a delivery of said polyurethane spray foam and or polyurea/urethane fast-set elastomeric coating, polyaspartic ester coatings, or any two-component fluid materials that can be mixed by static or impingement mixing in combination with the other independently driven hydraulic reciprocating piston pump having a volumetric flow rate from about 3 to 5 GPM, and said delivery being substantially free of pulsations and component ratioing errors;

(b) a counter configured to measure the work performed by said pump, wherein the work corresponds to an actual ratio of the flow rate of one of the at least two components flowing through one of said at least two flow lines to the actual ratio of the flow rate of another of the at least two components flowing through the other one of said at least two flow lines;

(c) a first check valve disposed on a first end of said each flow line so to prevent pulsations and backflow into the outlet filtered system;

(d) a second check valve disposed on a second end of said each flow line so to prevent cavitation, pulsations, and severe clogging; and to assure forward movement of the fluid so that the draw or siphon tube and suction hose are always full of fluid when the pump begins its upward fill stroke;

(e) a needle valve that is either manually controlled or electronically controlled by a programmable logic controller (PLC) for controlling the flow rate at any variable ratio in at least one of said at least two flow lines, wherein each of said at least two flow lines is configured to be connected at said first end to the spray gun and said second end to each of the discrete drums, each of the at least two components is drawn from each of the discrete drums and moved to the spray gun to be mixed and dispensed, said first check valve is adapted to prevent any amount of the one of the at least two components of one flow line from flowing backward toward the pump and said second check valve is adapted to prevent cavitation and keep a prime in said independently driven hydraulic reciprocating piston pump and if said actual ratio deviates from said desired ratio, said needle valve is adjusted to any variable ratio either manually or by PLC control.

2. The modular plural component spray system of claim 1, further comprising a valve for controlling the variable flow ratio of one of said at least two flow lines, wherein said valve comprises a flow coefficient of at least 0.63.

3. The modular plural component spray system of claim 1, further comprising a bleed line coupled at a third end to an output of said pump and at a fourth end to one of the corresponding discrete drums.

4. A modular plural component spray system for spraying polyurethane spray foam and or a polyurea/urethane fast-set elastomeric coating, polyaspartic ester coatings, or any two-component fluid materials that can be mixed by static or impingement mixing where said modular plural component spray system is configured for drawing at least two components, each stored in a discrete drum and sending the at least two components at any variable desired ratio, at temperatures of up to 180° F. and pressures of up to 3500 psi, to a spray gun, said spray system comprising at least two flow lines, each flow line is adapted to receive one of the at least two components, said each flow line comprising:

(a) an independently driven pump capable of a delivery of said polyurethane spray foam and or polyurea/urethane fast-set elastomeric coating, polyarspartic ester coatings, or any two-component fluid material that can be mixed by static or impingement mixing in combination with the other independently driven hydraulic reciprocating piston pump having a volumetric flow rate from about 35 GPM, and said delivery being substantially free of pulsations and component ratioing errors;

(b) a proximity switch that is configured to electronically measure the work performed by said pump, wherein the work corresponds to an actual ratio of the flow rate of one of the at least two components flowing through one of said at least two flow lines to the ratio of the flow rate of another of the at least two components flowing through the other one of said at least two flow lines;

(c) an insulated aluminum thermal-mass preheater disposed outside of each of the discrete drums downstream from said pump to heat the fluid materials to the correct temperature before entering the heated spray hose; and (d) a needle valve for controlling the variable ratio of the flow rate either manually or automatically by use of a PLC-controlled stepper motor that is attached to the needle valve in at least one of said at least two flow lines, wherein each of said two flow lines is configured to be connected at a first end to the spray gun and a second end to each of the discrete drums, each of the at least two components is drawn from each discrete drum and heated with said heater or preheater before arriving at the spray gun to be mixed and dispensed and if said actual ratio deviates from said desired variable ratio, said plug-type needle valve is adjusted either manually or automatically by use of a PLC-controlled stepper motor that is attached to the needle valve.

5. The modular plural component spray system of claim 4, wherein each said counter is a proximity switch that is configured to electronically measure the work performed by said pump.

6. The modular plural component spray system of claim 4, further comprising a check valve disposed on said first end.

7. The modular plural component spray system of claim 4, further comprising a combined nonmetallic automatic self-cleaning screen and check valve disposed on said second end.

8. The modular plural component spray system of claim 7, wherein said check valve comprises a nylon check ball with an automatic cleaning screen or filtered inlet so to prevent clogging and backward flow that is cause by particles and to ensure seating of the nylon check ball.

9. The modular plural component spray system of claim 4, wherein said needle valve comprises a flow coefficient of at least 0.63.

10. The modular plural component spray system of claim 4, further comprising a bleed line coupled at a third end to an output of said pump and at a fourth end to one of the corresponding discrete drums for testing, balancing pressures, and transferring fluids.

11. The modular plural component spray system of claim 4, further comprising a screen disposed on said second end with an automatic cleaning screen or filtered inlet so to prevent clogging and backward flow that is cause by particles and to ensure seating of the nylon check ball.

12. The modular plural component spray system of claim 4, further comprising an insulated block-type thermal-mass preheater for heating said at least two components without exposing said at least two components to heating elements. Six aluminum helix ribbon twists are incorporated in the cylinders to enhance the heating of the fluids as they flow through the cylinders. The preheaters can be combined into multiple preheaters for added heating ability. The thermal-mass preheater flows two independent highly chemical reactive fluids at the same time. The preheater is specially machined and designed to accept one or two ¾" diameter by 18" long fire rods or cartridge heaters that are each capable of 5,000 watts of heating capacity at 3500 psi. The second cylinder bore in the preheater could include an aluminum tube to recirculate hot liquid through the radiator of a generator. This flexibility allows two methods of heating the thermal-mass preheater.

* * * * *